Jan. 15, 1963 B. B. SKOGGARD 3,072,929
HOLLOW STRUCTURES AND METHODS FOR FORMING SAME
Filed Oct. 22, 1959 4 Sheets-Sheet 1

INVENTOR.
BRUNO B. SKOGGARD
BY
ATTORNEY.

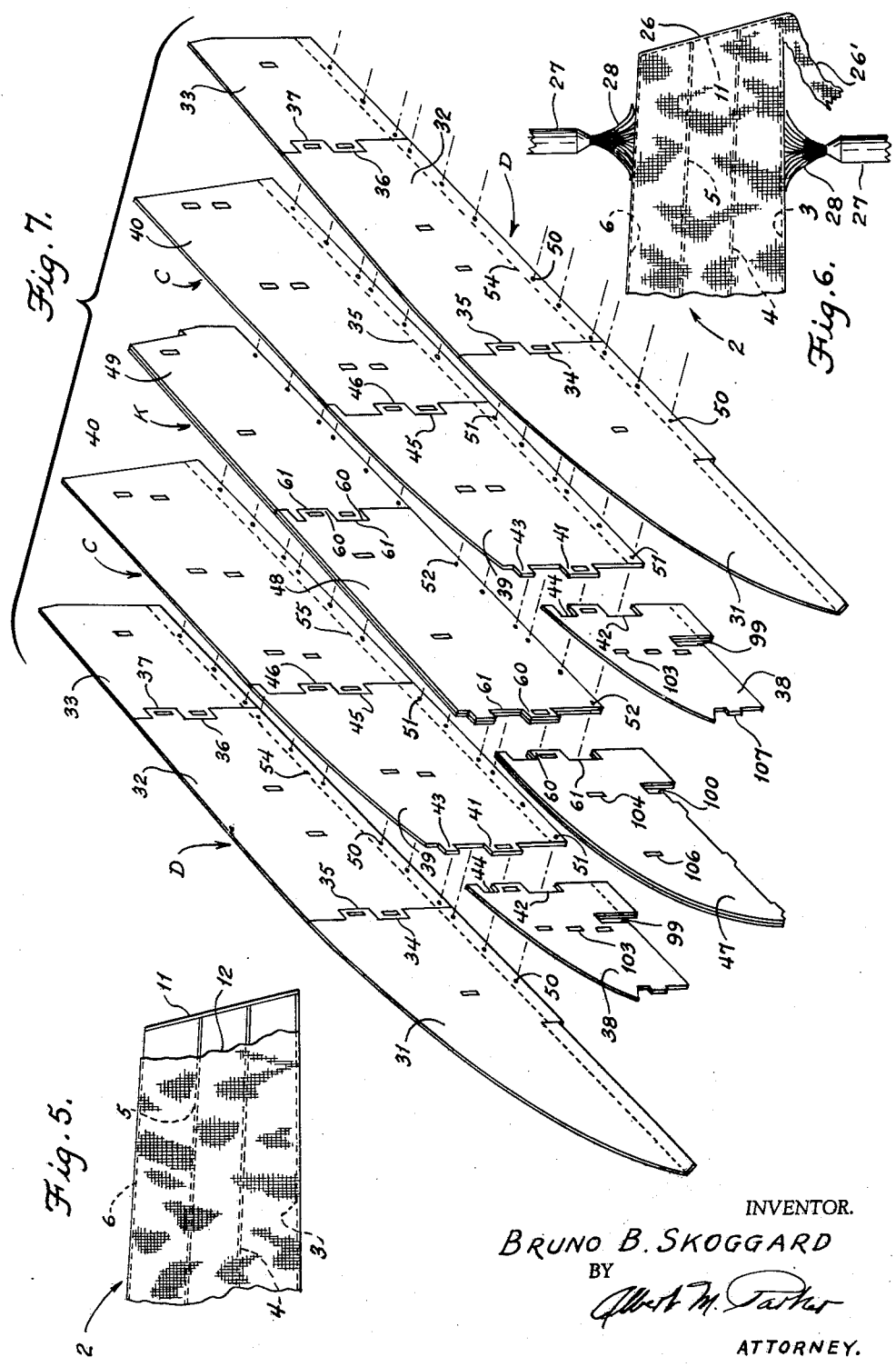

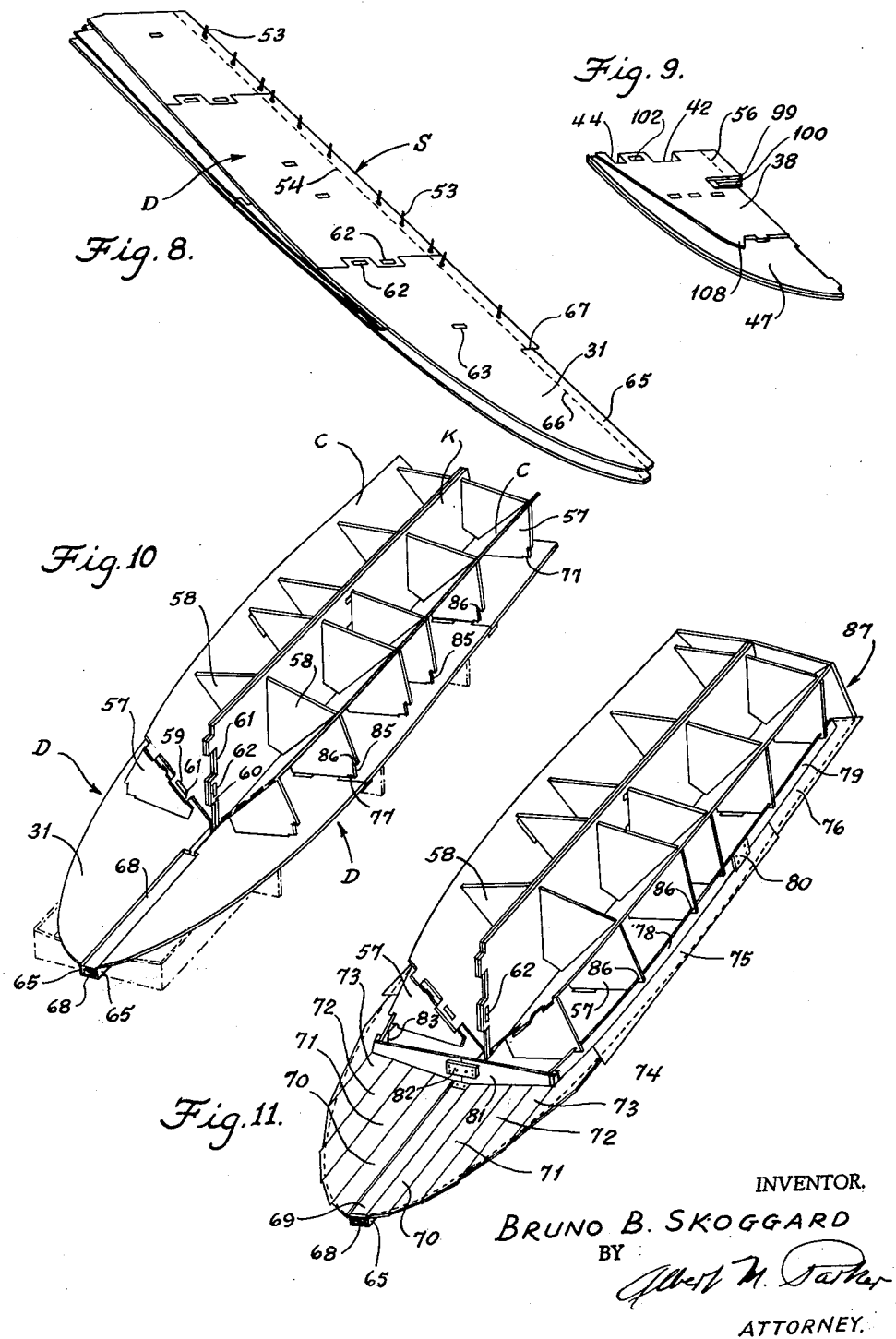

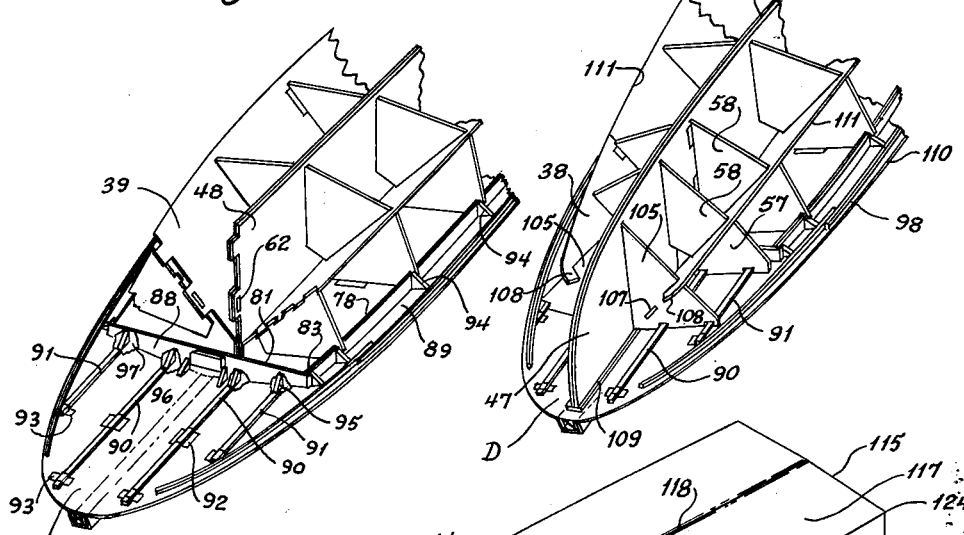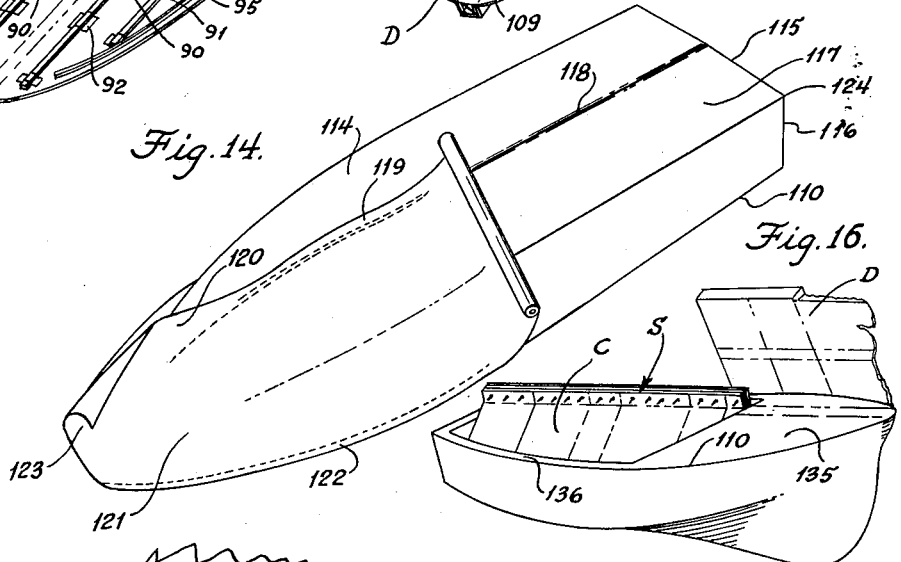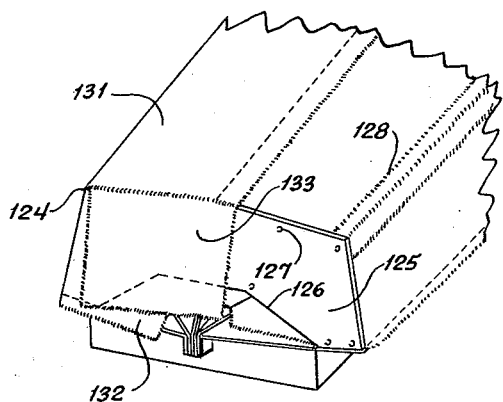

United States Patent Office 3,072,929
Patented Jan. 15, 1963

3,072,929
HOLLOW STRUCTURES AND METHODS
FOR FORMING SAME
Bruno B. Skoggard, Cold Spring Harbor, N.Y.
Filed Oct. 22, 1959, Ser. No. 848,164
4 Claims. (Cl. 9—6)

This invention relates to hollow structures and methods for forming the same and is particularly concerned with strong light weight hollow structures, of which boats, airplane elements, and small buildings are examples, and with methods for forming the same.

This application is a continuation in part of my application Serial No. 772,996 entitled Hollow Structures and Methods for Forming the Same, filed November 10, 1958, now abandoned.

For facilitating an understanding of the invention, the same will be described as embodied in a boat and the method of forming the same. It is to be understood, however, that this is for simplification of presentation and is not to be considered in a limiting sense.

Heretofore in the forming of boats, whether from wood, metal or moldable materials, the most common practice has been to form a framework of a keel of transverse frame members joined to the keel at closely spaced positions along the length thereof, plus additional longitudinal members to apply the outer planking, or skin, to said framework. The framework was, of course, incorporated in the finished construction. This is obviously a time consuming expensive operation.

More recently, some work has been done in forming sections of boats in molds and securing such sections together in various manners. In the smaller sizes, complete boats have been formed in molds. Here, again, however, the expense of the mold is very substantial. Skilled workers are needed to do the job properly, thus little is gained by way of economy and the work is not such as can be carried on by the home workman with reasonable skill in handling materials and structures.

The boat of the invention and method of forming the same change all this and enable the production of a strong, economical boat by procedures which can be followed by anyone with moderate skill in handling materials. Additionally, the complete construction can be effected in a minimum of time with economical materials and without any of the aggravations of fitting or forming to exact shape which are prevalent in the practices heretofore employed. Conventional framing is eliminated and such framing as there is, though capable of providing the necessary contours, is of the utmost simplicity and it is easily and quickly erected.

More specifically, the invention contemplates the production of boats from what could be considered as a book mold, since the frame elements to give the contour are longitudinal, rather than transverse, and all extend out from a longitudinal center zone, like the leaves of a book. Then, if each leaf has its longitudinal free edge properly shaped, the assembly of leaves will impart the contours desired at the various stages along the length of the hull. Effective framing can thus be formed in this way instead of in the prior art manner. For finer contours one need merely increase the number of leaves to be used. Furthermore, the longitudinal center line is the axis of the whole framing which can extend out through all of the 360° around the axis.

If the deck is to be flat, then the framing of the boat can be readily effected by laying a sheet of framing material down flat and extending the leaves up from the axis, which, in this case, will be the longitudinal center line of the deck.

The leaf framing of the invention can be made out of cheap, readily destructible material, since it does not form a part of the finished product, but is removed therefrom in the finishing.

After the framing is set up in the manner mentioned, one merely needs to draw a sheath, or sock, of fabric material thereover capable of stretching widthwise to fit the contours. In this way, the basic formation of the boat is achieved. When this sock of fabric material is rendered rigid by the application and setting of a settable fluid material thereto, the principal work is done. The construction is completed merely by applying additional layers of suitable material over the set sock and setting them by the use of settable fluid material.

Finally, in the case of a boat where the interior is to be occupied, the cockpit opening is cut through the deck, the framing members are removed and the work is done except for finishing operations.

Accordingly, the invention is principally concerned with improving and economizing on the construction of boats, or comparable hollow structures.

Another object is to simplify the methods for production of boats.

Still another object is to provide boats which are self sustaining, strong and rigid without internal framing and with a maximum of space therein.

Still another object is to provide methods for the production of boats which enable that production to be carried out by relatively unskilled workers without any specialized tools.

A further object is to provide for the production of boats in a fraction of the time that it has heretofore been required for doing so.

A still further object is to provide boats which are manufactured out of commonly available economical materials which can be readily handled and effectively conformed.

Still further objects are to provide boats which are light in weight, are strongly resistant to deterioration, and do not need the usual costly refinishing to which boats are subjected to maintain their condition and appearance.

Further and more detailed objects of the invention will in part be obvious and in part be pointed out as the description of the invention taken in conjunction with the accompanying drawing proceeds.

In that drawing:

FIG. 5 is an enlarged fragmentary elevation showing the aft portion of the boat with the sheath approaching the stern end of the framing and with the transom piece in place.

FIG. 6 is a view similar to FIG. 5 but showing the sheath pulled all the way in to final position and across the stern to overlie the transom.

FIG. 7 is an exploded perspective view of the various sections of destructible framing material for use in the framing up of a boat in accordance with a more detailed form of the invention.

FIG. 8 is a perspective view of those portions of the pieces of framing material employed in the initial set-up of the framing, showing the same assembled together as leaves in closed book form.

FIG. 9 is a similar view of the remaining framing portions which are held out until a later stage.

FIG. 10 is a perspective view of the framing or leaf portions of FIG. 8 opened out into open book form with the spaces set between the leaves thereof.

FIG. 11 is a similar view showing the positioning of various elements to remain as part of the finished boat.

FIG. 12 is a fragmentary perspective view showing the addition of further elements to stiffen and strengthen the framing of FIG. 11.

FIG. 13 is a view similar to FIG. 12 showing the framing in completed condition with the bow pieces of FIG. 9 added thereto.

FIG. 14 is a perspective view of the frame of FIG. 13 with the sock pulled thereover and showing the commencement of the application of sheets of fibre glass thereon.

FIG. 15 is a fragmentary perspective view of the transom of the boat in substantially completed condition; and FIG. 16 is a perspective view on reduced scale of the finished boat showing the destructible frame material being removed therefrom.

In the accompanying drawing, the invention is illustrated as embodied first in a rough basic form, and then in a more finished form, in a relatively small boat and in the construction thereof. For simplification the boat 1 of FIGS. 1–6 has been shown as one having a flat deck, so that the leaf member 3 is merely a flat piece of material laid down to serve as the base. Thus the axis A in this instance, is the longitudinal center line of the framing piece 3.

Figure 2:
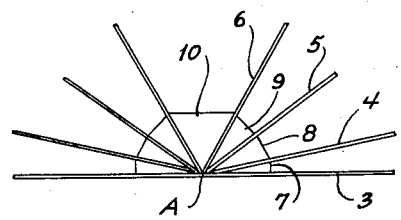
FIG. 2 is a vertical section taken on lines 2—2 of FIG. 1 and looking in the direction of the arrows.
Figure 4:
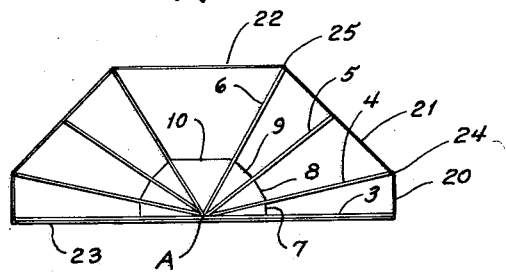
FIG. 4 is a view similar to FIG. 2 but showing the sheath in place over the frame.

The framing of the boat is best accomplished with the frame pieces, or leaves, applied in an upside down position. Referring to FIGS. 2 and 4, the various leaf members, such as 4, 5, and 6, are shown as suitably adhered to one another adjacent their meeting edges or to the member 3, as the case may be, and as positioned at various angles about the axis A in accordance with the hull contour desired. This positioning of the frame leaves is achieved and maintained by the use of spacer members, such as 7, 8, 9 and 10, advantageously strips of material the same as that of the leaves. These spacer strips are likewise adhered to the leaves which they engage by adhesive tape, or in other suitable manner. The spacers are located at separated positions along the length of the framing, depending on such factors, among others, as the size of the boat to be made and the strength of the material to be used for the leaves.

When the framing is otherwise completed, a transom piece 11 is applied across the stern end thereof. This is preferably of heavier, or more rigid material, than the framing, since it is likely to be the one piece which remains as part of the finished boat.

Figure 1:
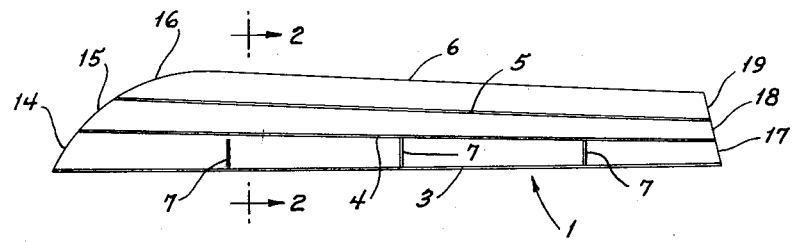
FIG. 1 is a side elevation of the framing of a small boat in accordance with the invention showing the same in upside down position.

Referring to FIG. 1, it will be seen that the longitudinal contour of the hull is established by the curves and lines applied to the edges of the framing pieces, 4, 5 and 6, as shown at 14, 15 and 16, where they round into the bow and at 17, 18 and 19 where they incline inwardly and upwardly to give the proper cant to the transom.

Assuming the hollow structure to be one intended to have its interior occupied, all of the framing pieces, or leaves, with the possible exception of the transom are intended to be removed once the wall or skin is completed. Hence the forming of the framing members of readily destructible material. The leaf or framing material is thus as cheap as possible, so long as it has sufficient strength, having regard to the size of the construction, to enable it is maintain its shape and position. Strenthening, of course, can be facilitated by the increasing of the number and size of the spacer members, such as 7, 8, 9, and 10.

Figure 3:
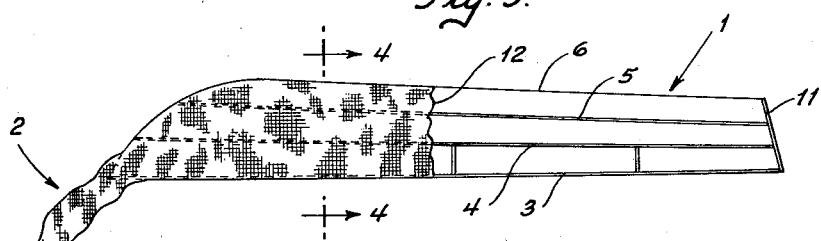
FIG. 3 is a view similar to FIG. 1 but showing the sock or sheath for the framing pulled part way thereover.

The initial sheathing, or sock members, as shown at 2 in FIG. 3, which is pulled over the frame preferably from the bow end, does not need to be formed of heavy material. It merely needs to have sufficient stretch and resiliency sideways, or in a transverse direction, without any appreciable longitudinal stretch, so that as it is pulled over the framing it will conform to the contours imparted by that framing, as well as effectively bridging the spaces between the edges of the frames, or leaves. The leaf members may thus be readily formed out of various paper products, such as carboard, corrugated board and various impregnated and laminated materials. In practice it has been found that commercially available corrugated board will serve admirably for the framing of small boats up to 20 feet in length. It is cheap and can be obtained in multiple thicknesses where needed to meet strength requirements. If stronger material for the framing of larger boats is needed, light weight plywood and various hard boards may be employed.

It is believed to be apparent from the description so far that the framing for a boat or other hollow member in accordance with the invention is of a nature which would lend itself much more readily to boat construction by a "do it yourself" workman than the framing of boats in accordance with prior practices. In fact, it has been found that without any particular skill and merely by following simple instructions, the ordinary home workman can build a complete small boat in accordance with the form of the invention of FIGS. 1–6 in the course of a morning, i.e., in a matter of a few hours.

The initial sheathing is applied to the frame by first roughly forming a piece of material as shown at 2 into what is illustratively referred to as a "sock," since it has an open end 12 and a closed end 13 with the intermediate portion having its edges joined or being otherwise formed to make a "sock" like figure. The joining may be by sewing, stapling, adhering, or otherwise securing the edges of the material together. Preferably, the sock 2 is applied to the framing so that the joint, or seam, comes at some place where it does not noticeably affect the hull contour. In the form here shown that place would be down the center line of the deck.

Though the material used in the forming of the sock 2 is not particularly heavy, it nevertheless should have sufficient strength in the longitudinal direction, the direction in which it is drawn onto the framework to prevent it from stretching. On the contrary, the material should stretch and have resilience in the transverse direction so that it will fit the contour of the framework and when in place will extend from one frame leaf to the next without sagging. Various fibrous and fabric materials readily available on the market have these characteristics. One in particular which has presently been found to be highly effective, is inexpensive, and is readily available, is the cloth known as "jersey."

Considering, then, for the purposes of illustration, that the sock 2 is made of jersey and is generally formed so that it will stretch transversely to the extent necessary to enable it to be pulled over the frame 1, this is accomplished as seen in FIGS. 3 and 4 by applying it over the framing at the bow end and drawing it back over the frame work. Thus, when the sock is pulled on to the position of line 4—4, the material thereof will lie over the framing and stretch between the edges thereof, as shown at the portions 20, 21, 22 and 23, in FIG. 4 and will have its own natural roundness, as it turns the corners at the positions 24 and 25. Besides the stretching the resiliency of the material will hold the sections 20, 21 and 22 substantially straight transversely, also because the material does not stretch particularly longitudinally and is pulled taut longitudinally as it is applied, these sections will be kept flat throughout.

Of course, for a boat construction with a relatively rounded bottom, a greater number of leaves than those here shown would have to be applied. The construction shown in FIGS. 1–6 is between that of a round bottom and single chine form.

In FIG. 5, the sock 2 is shown as having been pulled almost to the end of the framing and to be reaching the transom member 11. This latter member, since the stern of the boat may well be employed for carrying a rudder, or an outboard motor, would normally be a frame piece that would remain as part of the boat. Accordingly, it can advantageously be made of stronger, heavier material than the material used in making up the leaves.

The manner in which the sock is drawn over the transom 11 is illustrated in FIG. 6, where the portion 26 extending up from the bottom is shown as drawn up across the transom to join with the terminating extending portion of the sock 26'. With the sock so positioned and covering all of the framework, the next step is ready to be taken.

The next, or stiffening, step involves the setting of the sock material in the shape imparted to it by the framing. This is done simply and easily by applying a settable water impervious material to the sock material 2 throughout the whole of the boat. This material may be any varnish, or varnish-like liquid, or one of a variety of resins, such as the polyesters, or the epoxy resins. It need not be an expensive one. It merely needs to be absorbed by and form with the material of the sock a hard shell member or mould to which other layers can be applied without disturbing the framing. The settable binder used in setting the jersey should preferably be the same as that used for the filling and setting of subsequent layers of material, since it is desirable to have all of the layers cohere in a uniform bond.

The settable binder is shown in FIG. 6 as being applied in the form of a spray. The binder can also be applied by a brush, be spread on by a squeegee, or in other suitable manner. In any event, sufficient binder material should be supplied to fill the pores of the jersey throughout and supply sufficient additional material to give a strong stiffening effect and provide a base for the application of the next layer. Also, the settable material applied to the jersey should preferably be allowed to set up well before the next layer is put on.

Actually, the sock, when set up hard by the use of a binder, becomes the mould on which at least the hull of the boat is built up as well as remaining as the base element of the boat itself. Once such mould is formed the desired thickening and strengthening of the hull and/or other wall elements is effected by applying sheets of material onto the outside of the mould, one on top of another, in the desired number of layers. Various fabrics and cellulose products are usable for the purpose with the variety being greater where the size and shape of the mold is such that it is preferable to apply the material in individual strips rather than trying to cover the whole of the hull with one piece of material.

When the initial settable binder for the sock mould has set, the next step in the course of building up the wall is to apply another coating of binder thereon. The sheet of material to form the next layer is then positioned on the binder coated mould before it sets up. Preferably the sheet material should be pervious to the binder so that the binder will flow, or ooze, through the pores of the sheet. The strips of sheet material are then worked down to smoothly overlie the mould by "ironing" them with the hands. Once smoothness is achieved, with all wrinkles and bubbles worked out, another coating of resin, or binder material, is applied to the outer surface of the covering sheet. Before that resin has set, the next layer of sheet material is applied over the first in the same way as the first layer was applied onto the mould. For a small boat, and even one where the decking, at least part way inboard, as well as the hull, are to be formed merely of layers of adhered sheet material, large sheets of woven roving fiberglass cloth can be employed to make complete layers all of one piece. This is due to the capacity of such cloth to be stretched and formed in various directions without creating wrinkles or pleats. For larger hulls, and where the decks, gunwales and other elements are of preformed material positioned in place with respect to the framing before the sock is applied, the build up of the hull strength and thickness by applying fiberglass cloth, or other suitable material in strip form, is the preferable practice. In the embodiment about to be described two such strips of sheet material, each covering one-half of the hull with an overlap between them along the keel line, are employed for each layer. They are likewise applied in the same manner as continuous sheets as just described.

In the more detailed embodiment of the invention as shown in FIGS. 7–16, each of the framing pieces, or leaves, is made up of interfitting sections. Thus the frame pieces for a fairly good sized boat can be readily shipped and handled. By reference to FIG. 7, it will be seen that the identical deck frame leaves, generally indicated at D, are made up of identical forward sections 31, mid sections 32, and aft sections 33. Where these join transversely they have interfitting tongue and slot relationships as seen at 34, 35, 36 and 37. Likewise, the chine framing pieces C are identical and are made up of identical forward sections 38, mid sections 39, and aft sections 40. Again, where these sections are joined transversely they are provided with interfitting tongue and slot portions 41, 42, 43, 44, 45 and 46. The framing for the keel generally indicated at K, is also made of identical pieces butlaid together to double their thickness, as seen in the various figures. Here there are forward identical sections 47, mid sections 48, and the aft sections 49. These, like the framing pieces D and C are joined with interfitting tongue and slot portions 60, 61.

Inasmuch as this form of the invention provides for the inclusion in the mould of preformed inserts for forming the fore deck and the dashboard, as well as other parts, the forward chine sections 38 and forward keel sections 47 are kept aside from the principal framing, are assembled as a separate book and are brought into position at a later time. The FIG. 8 showing then is of the book of framing leaves including complete deck pieces but only the mid and aft sections of the chine and keel leaves positioned therebetween with the book in closed form. FIG. 9 shows the separate assembly of the forward sections 38 of the chine leaves assembled in closed book form with the forward doubled keel sections 47 therebetween.

In FIG. 7 all of the overlying leaf portions are shown as formed with a series of aligned holes 50, 51, and 52 therethrough at spaced positions adjacent their bottom edges. These holes, as seen in FIG. 8, receive bolts 53 which, with suitable nuts and washers, clamp the bottom edges of the strips together like the binding of a book but referred to hereinafter as the "spine S." Additionally, the sections preferably have their opposed faces, within the confines of the strips between the dotted lines 54 and 55 and their bottom edges coated with a glue, or adhesive, so that when clamped together by the bolts they also adhere and are held tightly together throughout their lengths. In the case of the forward elements of FIG. 9, they are preferably merely glued together at their opposed faces between the line 56 and the bottom edges.

The next step of the framing is shown in FIG. 10. Here the book of FIG. 8 has been opened up by bending the deck frames and chine frames outwardly above the spine about the dotted lines 54 and 55. The framing is in upside down position with the deck leaves and spine seated on a suitable supporting cradle indicated in dot-dash lines. The desired angular relationship of the leaves, is established and maintained by various series of spacer members, such as those at 57 between the leaves D and C and those at 58 between the leaves C and K. Also, as is apparent at the forward end of the showings in FIGS. 10 and 11, certain of the spacer members are provided with tongues 59 extending up from their edges to interfit with the openings 62 formed in the various tongue members, such as 34, 41 and 60. Others of the spacer members have similar tongues formed to interfit with other appropriate framing sections as seen at 63 in FIGS. 7 and 8. Thus the spacer members not only serve to maintain the leaves in their proper spaced angular relationship, but they also effect an interlocking of all the framing sections. The tongue and slot relationship also keeps the spacers from being displaced longitudinally.

In the making up of the pieces for framing kits a code system of marking is employed which facilitates the positioning and fitting of the pieces with respect to each other. Preferably also the leaf sections are glued in their interlocking end to end relationship. Likewise the spacer members should be glued in place between the leaves.

Referring now to FIG. 8, it will be seen that the forward deck frame sections 31 have strips 65 along their lower edges which are set back slightly from the normal lower edge and have a bending line 66 set above the line 54. A cut is formed at their inner ends 67 extending up on the line 66. The purpose of this, as seen in FIG. 10, is to enable the portions 65 to be bent at an angle to provide a pocket for the reception of a suitably formed elongated bar-like member 68. The member 68 is preferably folded out of material similar to that forming the framing. It is also to be noted that the upper surface of this member 68 is below the upwardly facing surfaces of the deck frame sections 31, as viewed in FIG. 10. The purpose of this is to provide a support for the center member, or more commonly called "king plank" of the deck.

Referring now to FIG. 11, the king plank 69 is shown in position as are the veneer strips parallel to it forming the deck. These strips are laid down parallel to the king plank with their best side facing downwardly since that would be the upper surface when the boat is completed. The inner strips 70, preferably overly the king plank to a short extent, while all of the remaining strips are butted in edge to edge relationship and initially secured together by having their butted edge faces glued together.

Gunwale planks 75 anr 76 are next seated in place along the edges of the deck, as seen in FIG. 11. They have their inner portions received in notches 77 in the spacer members 57, which notches are best seen in FIG. 10. The gunwals planks are further locked in place by the application of the preformed assembly of coaming pieces 78, 79, themselves suitably joined together at 80, with the dashboard member 81. The dashboard member 81 is likewise made of two pieces joined together by the butt block 82. The coaming members 78 and the dashboard members 81 are suitably glued together at their corners 83 and by having a fiberglass overlay strip glued thereto.

The coaming members 78, 79 are held in position by being snapped into the recesses 85 (FIG. 10) provided in the edges of the spacer members 57. These recesses are notched upwardly at 86 to receive the edges of the coaming members. It will thus be seen that this assembly not only holds itself in place, but assists in holding the gunwale members in place until further retaining means is provided.

Finally, a transom board 87, suitably recessed in its upper surface for the reception of an outboard motor, is secured to the rear ends of the framing members, which may be done at this stage, but is preferably done at one of the subsequent stages.

Once the deck, gunwale and coaming members are positioned as just described, they need to be more substantially secured in place and supported prior to the completion of the framing and the application of the sock thereover, as well as for subsequent strength. This may advantageously be achieved by laying one or more sections of fiberglass on the upper surface of the deck strips as they appear in FIG. 11. This, of course, is the undersurface of the deck of the finished boat. First, this undersurface is coated with resin as is the face of the dashboard 81. Then a piece of fiberglass is laid on the deck, ironed smooth with the hands, and formed up the outer face 88 of the dashboard 81 as well as around the corners 83 thereof. Likewise, strips of fiberglass are advantageously secured down along the underside 89 of the gunwale planks and up the outer face of the coaming pieces 78 and 79.

Once the binder for the first layer of fiberglass has set sufficiently, a second layer can be applied, and is preferably applied, over the deck, ironing it on in the same manner as the first layer and carrying it up over the face 88. Thus the deck, as seen at FIG. 12, is eventually covered at D on what becomes the inside when the boat is completed with two layers of fiberglass strongly adhered in position. For further reinforcement and strengthening of the deck, deck ribs 90 and 91 are applied onto the fiberglass D and glued thereto along the contacting face as well as being additionally held in place by means of fiberglass members such as 92 and 93.

Further stiffening of the deck and of the coaming and gunwales is effected by the use of triangular block members, such as 94, around the coaming and 95 and 96 on the front face of the dashboard. These are suitably glued in place and, in addition, the blocks 95 which seat on top of the deck ribs 90 and 91 and adhere to the adjacent face of the dashboard 81 have small sections of fiberglass adhered in place over them, as seen at 97.

When the blocks 94 are in place, the strips 98, which may be formed by being joined out of several pieces are glued to the inner surface of the gunwales and deck and are secured up against the blocks 94 for further reinforcement along this line of the boat. Once the glue securing these elements has set it is in order to apply the forward sections of the keel and chine framing previously held out as seen in FIG. 9.

These forward framing sections, as seen in FIG. 9, like the main framing sections, are opened out like the leaves of a book with the keep portions 47 forming the center part to which the chine portions 38 are secured for opening out like the leaves of a book. The respective recesses and projections 42, 44, 60 and 61 are engaged and interfitted with their mated opposites extending out from the ends of the chine and keel sections 39 and 48. The sections 38 are also recessed upwardly from the bottom as shown at 99 and the keel sections 47 are similarly recessed at 100 so that they will fit down over the dashboard 81.

Additional spacer members 58, aligned with the joint between the frame members 38 and 39 and the keel members 47 and 48 have tongues interfitting with the various openings, such as those shown at 62 in FIGS. 10, 11 and 12, and 102 in FIG. 9, to assist in interlocking these frame members together as well as holding the angular spacer members in proper position. There is also a further set of spacers 105 at the forward end. These have openings through them to receive the tabs 107 projecting from the end faces of the chine sections 38. Also, the spacer members 105 are recessed downwardly to receive the projecting ends 108 of the chine sections 38. Otherwise they are formed to fit up against the ends of the chine sections and interfit with the deck beams 90 and 91. The straight bottom edge of the keel section 47 is glued to the deck and may if desired have strips 109 glued thereto and to the deck and sides of the keel section 47 to hold the keel section straight and rigid.

The first transom board 87, illustrated in the accompanying drawing as having been applied in the FIG. 11 stage, is preferably applied in the sage of FIG. 13 when the sheer line has been contoured enabling the transom to be more accurately fitted. When added it is secured in place by small strips of fiberglass resined to its inner surface and to the adjacent outer surfaces of the coaming pieces and upper surfaces of the gunwale strips.

Once the framing is otherwise all complete, it is desirable to smooth off all edges over which the sock will rub as it is applied. Thus the sheer line 110 should be smoothed off and preferably rounded in cross section, taking care not to spoil its contour. Then the free edges 111 of the chine leaves and 112 of the keel leaf are preferably covered with a strip of fiberglass running therealong, though this is not always necessary.

To prepare for the application of the sock, the bow end of the framing is raised from its cradle so that the already preformed sock 114 can be readily pulled onto it in the same manner as illustrated in FIG. 3. The sock should first be turned inside out so that any seams will lie on the inside and positioned so that one of the seams runs down the keel and the others, if any, run along the deck, which is the underneath surface insofar as the framing is concerned.

The sock is drawn back over the frame towards the transom and eventually the bow is lowered and the transom end of the framing raised so that the sock can be pulled all the way on. The sock should extend 8 to 10 inches beyond the transom. When all the way on the sock is tacked, or stapled, to the outer face of the transom close to the transom edge. Then when the sock is fully in place alignment of the sheer lines, chines and keel is checked and straightening if necessary is effected by moving the framing leaves gently by pushing on them through the sock.

At this point the resin is prepared, including the necessary amount of catalyst if called for. The resin may then be sprayed on, as shown in FIG. 6, but preferably is brushed on in order to make sure that it is evenly applied to the hull. The important thing here, however, is that the sock should be covered with resin down to and including the sheer line 110, but, as distinguished from the FIG. 6 form, the resin should not be applied around underneath the structure as viewed in FIG. 14. In the instant form where the sock material covers the wood or veneer deck and gunwale pieces, it should be left free of resin so that it can be readily removed. Care should be taken, however, to see that the sock is well saturated around the transom edges 115 and 116 without carrying the resin onto the back of the transom.

Having the sock completely and evenly coated with a resin which, if one of those previously mentioned, will set up hard if allowed to cure properly, the coated sock should be kept at a temperature of 70° F. or better and allowed to cure for at least eight hours.

Once the resin with which the sock has been impregnated has cured and hardened so that the resined sock truly forms a mould, the outer surface thereof should be sanded gently to remove any lumps. Also the staples, or tacks, should be removed from the transom and sock material overlapping the transom should be removed. Any sock material stuck to the transom should be sanded off. The mould is now ready for the application of the layers of fiberglass, or other suitable material thereto. Resin is then applied with a brush, or squeegee, to completely cover one side 117 of the hull and to overlap the keel 118 by approximately 3 inches, as shown at 119, and in a crescent shaped area at the bow end as at 120. A suitable strip of fiberglass 121 is then applied to the resined area starting at the bow overhanging the sheer line an inch or two, as shown at 122, and with a portion 123 lapping over the bow to cover the coated crescent portion. The strip 121 is controlled as applied and fitted by hand ironing as it goes along to make sure that it is evenly applied without wrinkles, bubbles, etc. The strip 121 is continued down over the transom and resined well to the transom. For proper fitting here the strip should be preferably slitted outwardly from the corner 124 where the chine and transom meet. Thus there is one piece to be pulled around from the side and the other is pulled down from the bottom, as seen in FIG. 15.

As soon as the fiberglass for one side is positioned it should be saturated evenly throughout with additional resin spread out with a squeegee, or brush, over both bottom and side and throughout the overhang 122.

Once the application of the sheet 121 is complete on one side, a similar sheet is applied in similar manner to the other side, making it overlap the keel 118 and the fiberglass laid thereover.

Once a complete layer of fiberglass is in place the second transom 125, as seen in FIG. 15, is applied over the fiberglass portions overlying the first transom board 87. This is done by applying resin to the inner face of the board 125 and placing it in position onto the fiberglass covering the first transom board, making sure that the outboard motor notch 126 is facing downward and corresponds with the similar notch in the board 87. Once the transom board 125 is properly positioned it is preferably additionally secured by means of screws 127 passed through it and into the first transom board.

In preparation for the application of the next layer, or layers, of fiberglass, it is desirable to reinforce the chines by laying strips of fiberglass therealong, as illustrated at 128 in FIG. 15. If these have a width of approximately 8 inches they will overlie the chines to sufficient extent to give it desired reinforcement. They should be applied, starting at the transom, be stretched straight as they go along and be applied to receiving strips of fresh, tacky, resin already applied to the hull. Once the strips are in position they are saturated with resin from the outside.

Thereafter, the second layer of fiberglass, all that is really needed for a strong construction in a small boat, is applied over the first layer in the same manner as described for the application of the strip 121 and its counterpart on the other side of the hull. In this instance, the second strip 131, as seen in FIG. 15, is again split at the corner 124 of the chine and first has the side piece 132 drawn in over the surface of the second transom board 125 and adhered to that surface by adequate resin. Then, the extending portion 133 of the bottom section is drawn down over the transom and to substantially overlie the portion 132 being resined to both the transom board and that portion. The second strip of the second layer is applied in similar manner to the first, ending up over the transom so that the transom board 125 is completely covered with nearly two more layers of fiberglass.

Once the second layer of fiberglass has been applied and coated with resin, it is allowed to set until the resin is all hard. Then a skeg may be glued in place if desired, using a strip of fiberglass overlying it and secured to the hull and to the skeg by suitable quantity of resin to hold the skeg effectively in place.

When the hull is completed with the resin fully set it is lifted off its cradle and turned right side up, as seen in FIG. 16. Then the sock is cut away within the overhanging fiberglass along the sheer line 110, and the deck framing leaves D are preferably cut off from the frame spine S and are removed as seen in FIG. 16. Thereafter the chine leaves are cut off from the spine and the leaf and spacer members removed. Following this, the keel leaf can also be removed, breaking it up as desired, since it is all to be discarded. What is left is a clear open hull with the resined sock material forming the inner surface, the fiberglass forming the outer surface of the hull and the mahogany or other wood strips forming the deck 135 and the gunwales 136.

At this point the upwardly extending part of the fiberglass above the deck level can be trimmed off along the sheer line 110. Any cement that has come through between the deck strips can be removed and the deck, gunwale, coaming and dashboard pieces can be sandpapered and varnished to suit. Seats, fittings, etc. can be applied in various manners, either by the use of additional fiberglass and adhesive, or by being made out of wood and fitted in place. These, however, may be varied greatly and form no part of the instant invention.

It has also been found in practice that hulls contoured with much more complexity than those here illustrated can be simply and quickly formed by following the invention procedures. In fact, a small sailboat with a keel has been made in accordance with the invention without any particular difficulty and in a most effective manner.

While in the foregoing a particular shape and particular type of member has been shown, and particular materials have been indicated as preferable, it is to be understood that these are for illustrative and not limiting purposes. The invention comprehends the forming of hollow members of any shape, capable of being achieved by the leaf-like framing of the invention, whether the framing be formed out of solid members as shown, or merely be of bent or formed strips to establish the lines. It also comprehends the provision of an initial skin of material stretchable principally in one direction and covering the principal part of the frame though not necessarily all of it. It is not believed that any comparable constructions have heretofore been made in such manner.

Speaking more generally, it is to be understood that certain changes in carrying out the above method and certain modifications in the products which embody the invention may be made without departing from its scope and it is intended that all matter contained in the above description, or shown in the accompanying drawing, shall be interpreted as illustrative and not in a limiting sense.

Having described my invention, what I claim as new and desire to secure by Letters Patent is:

1. A frameless hollow structure having longitudinal and transverse axes, said structure being formed of sheets of pliable material laminated together as a sandwich, the innermost sheet of said sandwich being made up of jersey cloth generally in the form of a sock, said jersey cloth initially being resiliently stretchable to a materially greater extent transversely of said sock form than longitudinally thereof, whereby said sock may be pulled endwise over a longitudinal framework of greater transverse section than the transverse section of said sock in unstretched form, said sock being prestressed both longitudinally and transversely and being stretched to a greater extent transversely than longitudinally, the next sheet of said sandwich being formed of unstressed pliable sheet material applied over said innermost sheet and a settable binder impregnating said unstressed sheet material and adhering to said innermost sheet.

2. A hollow structure as in claim 1, said innermost sheet being porous and an initial settable binder impregnating said innermost sheet in stressed stretched condition and said initial settable binder adhering to said binder impregnating said unstressed sheet.

3. A hollow structure as in claim 1, said next sheet being of fiberglass cloth sheet material.

4. A hollow structure as in claim 1, said hollow structure being formed as a boat, the open end of said sock being at the stern of said boat, a transom member closing said open end, said sock material bordering said open end being secured to said transom member, and said sock member having a portion of the side wall thereof removed to provide a cockpit opening communicating with the interior of said hollow structure.

References Cited in the file of this patent
UNITED STATES PATENTS

| | | |
|---|---|---|
| 2,232,313 | Burch | Feb. 18, 1941 |
| 2,617,126 | Nebesar | Nov. 11, 1952 |
| 2,807,811 | Atkinson et al. | Jan. 1, 1957 |
| 2,813,050 | Hickson | Nov. 12, 1957 |
| 2,815,309 | De Ganahl et al. | Dec. 3, 1957 |
| 2,941,216 | Carlson | June 21, 1960 |

FOREIGN PATENTS

| | | |
|---|---|---|
| 131,384 | Great Britain | Aug. 28, 1919 |
| 727,657 | Great Britain | Apr. 6, 1955 |